(12) United States Patent
Young et al.

(10) Patent No.: US 7,092,844 B1
(45) Date of Patent: Aug. 15, 2006

(54) DETERMINING CONFIDENCE INTERVALS FOR WEIGHTED TRIAL DATA

(75) Inventors: Stephen W. Young, Austin, TX (US); Daniel P. Karipides, Round Rock, TX (US)

(73) Assignee: Trilogy Development Group. Inc., Austin, TX (US)

( * ) Notice: Subject to any disclaimer, the term of this patent is extended or adjusted under 35 U.S.C. 154(b) by 0 days.

(21) Appl. No.: 10/896,162

(22) Filed: Jul. 20, 2004

(51) Int. Cl.
*G06F 19/00* (2006.01)

(52) U.S. Cl. ...................... 702/181; 702/176
(58) Field of Classification Search ................ 702/176, 702/179, 181
See application file for complete search history.

(56) References Cited

U.S. PATENT DOCUMENTS 6,003,027 A 12/1999 Prager ..................... 707/5
6,868,389 B1* 3/2005 Wilkins et al. ............... 705/10
2002/0082902 A1* 6/2002 Ando et al. ................... 705/10

* cited by examiner

*Primary Examiner*—Edward Raymond
(74) *Attorney, Agent, or Firm*—Hamilton & Terrile, LLP; Kent B. Chambers (57) ABSTRACT

Collected trial data is weighted to, for example, reflect the relevance of the data. A weighted confidence interval determination and application process described herein determines a confidence interval used to interpret the data. The confidence interval is derived by adjusting the sample size N to account for the impact of weighting when determining confidence intervals. The sample size N is adjusted in a downward trend to avoid overestimating the confidence interval. Lower and upper bounds of the confidence interval are determined using weight influenced variables. Thus, interpretation of weighted trial data, such as product demand data, can be achieved and acted upon with an accurate estimation of risk.

28 Claims, 6 Drawing Sheets

| Score | Transmission | Score | Transmission | Score | Transmission |
|---|---|---|---|---|---|
| 14 | Automatic | 22 | Automatic | 237 | Manual |
| 1 | Manual | 765 | Automatic | 920 | Automatic |
| 1 | Automatic | 22 | Manual | 892 | Automatic |
| 350 | Manual | 11 | Automatic | 197 | Manual |
| 1 | Automatic | 1 | Automatic | 9 | Manual |
| 15 | Automatic | 1 | Automatic | 5 | Automatic |
| 1 | Automatic | 5 | Manual | 1 | Automatic |
| 311 | Automatic | 16 | Automatic | 8 | Automatic |
| 304 | Automatic | 142 | Manual | 422 | Automatic |
| 105 | Manual | 1 | Automatic | 811 | Automatic |
| 913 | Automatic | 35 | Manual | 4 | Automatic |
| 30 | Automatic | 153 | Automatic | 55 | Automatic |
| 3 | Automatic | 17 | Automatic | 1 | Automatic |
| 17 | Automatic | 41 | Automatic | 857 | Manual |
| 155 | Automatic | 1 | Automatic | 55 | Manual |
| 1 | Manual | 89 | Automatic | 112 | Manual |
| 125 | Manual | 501 | Automatic | 2 | Manual |
| 476 | Automatic | 861 | Manual | 27 | Automatic |
| 8 | Automatic | 1 | Manual | 188 | Automatic |
| 591 | Manual | 125 | Automatic | 1 | Manual |
| 482 | Automatic | 511 | Automatic | 150 | Automatic |
| 34 | Manual | 223 | Automatic | 206 | Automatic |
| 123 | Manual | 1 | Automatic | 134 | Automatic |
| 10 | Automatic | 459 | Automatic | 617 | Automatic |
| 5 | Automatic | 347 | Automatic | 11 | Automatic |
| 151 | Automatic | 1 | Automatic | 849 | Automatic |
| 1 | Manual | 33 | Automatic | 978 | Automatic |
| 273 | Automatic | 1 | Automatic | 217 | Automatic |
| 1 | Automatic | 78 | Manual | 137 | Manual |
| 2 | Automatic | 521 | Automatic | 568 | Automatic |
| 362 | Automatic | 6 | Automatic | 460 | Automatic |
| 418 | Manual | 3 | Automatic | 139 | Automatic |
| 2 | Automatic | | | 234 | Automatic |
| | | | | 1 | Automatic |
| | | | | 659 | Automatic |

DETERMINING CONFIDENCE INTERVALS FOR WEIGHTED TRIAL DATA

BACKGROUND OF THE INVENTION

1. Field of the Invention

The present invention relates in general to the field of information processing, and more specifically to a system and method for determining confidence intervals for weighted trial data.

2. Description of the Related Art

Figure 1:
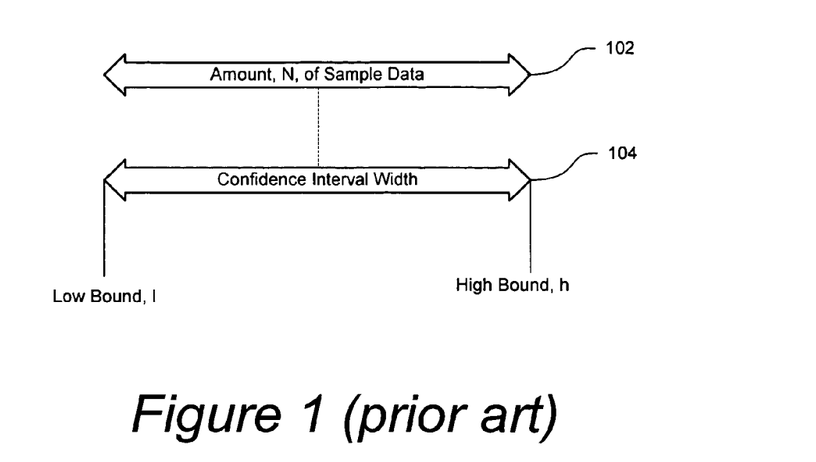
FIG. 1 (labeled prior art) depicts the effects of changing an amount of sample data on a confidence interval width.

Confidence intervals are often used to characterize the precision of statistical results obtained from sample data. A confidence interval gives an estimated range of values which will include an unknown population parameter with a confidence probability of $p_{conf}$. The estimated range is calculated from a number of trials in a given data sample. The width of the confidence interval provides an idea about the uncertainty of an unknown parameter. As depicted in FIG. 1, the width of the confidence interval is bounded by high, $h_i$, and low, $l_i$, bounds. As the number of trials N 102 increases, the width 104 of the confidence interval decreases.

Figure 2:
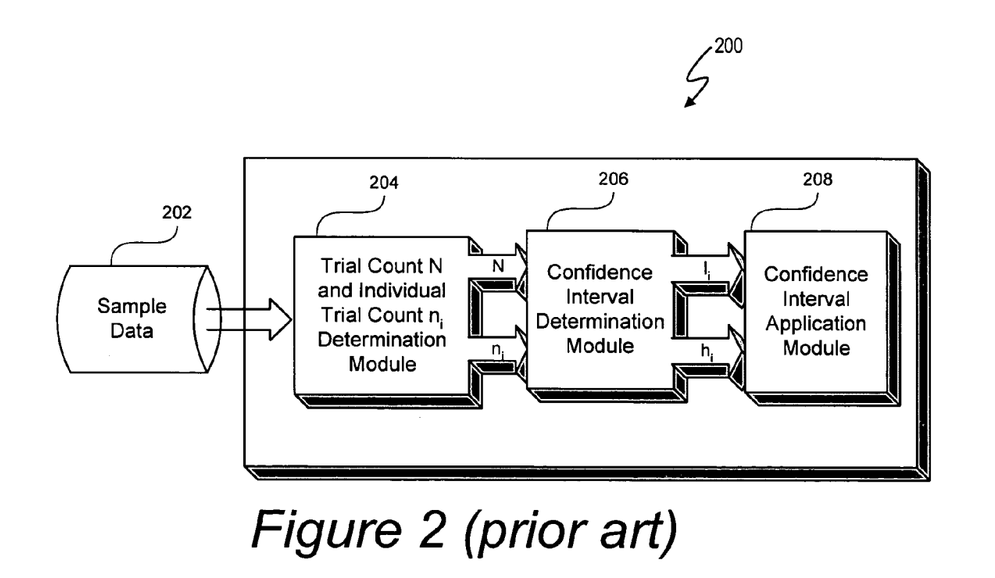
FIG. 2 (labeled prior art) depicts a conventional confidence interval determination and application process.

FIG. 2 depicts a conventional confidence interval determination and application process 200 using a computer system to determine confidence intervals. Process 200 takes in sample data 202. The N and $n_i$ determination module 204 determines from the sample data 202 the total number of N trials. Assuming that on any trial, there are j possible outcomes. Then, in N trials, there are $n_1$ trials resulting in outcome 1, $n_2$ trials resulting in outcome 2, . . . , $n_j$ trials resulting in outcome j, such that:

$$n_1 + n_2 + \ldots + n_j = N.$$

Thus, the expected probability $\theta_i$ of obtaining outcome i in any random trial is $n_i/N$, The confidence interval determination module 206 determines conventional confidence intervals that provide a confidence range ($l_i$, $h_i$) such that the unknown actual probability $\Theta_i$ of outcome i occurring in a random trial, given a sample of outcome i occurring ni times out of N trials, has a $p_{conf}$ probability of falling within the range $l_i \leq \Theta_i \leq h_i$. Once module 206 determines a confidence interval, confidence interval application module applies the confidence interval, bounded by $l_i$ and $h_i$, to data.

Application of confidence intervals to data can play a major role in the interpretation of data through an understanding of the precision of statistics derived from sample data. For example, for standard data samples confidence intervals can indicate whether trial data and information derived therefrom can be relied upon with a specified confidence probability, $p_{conf}$. Trial data refers to a collection of one or more individual sample data. For example, product demand data can be used to determine which products to build in order to match consumer demand. If the product demand data has a large confidence interval, then building products in accordance with the product demand data can represent a significant commercial risk.

In most circumstances each outcome i is weighted equally with every other outcome. For example, rolling a one (1) on a die is weighted the same as rolling any other number on the die. In other words, a one (1) outcome has no more significance than any other number outcome. In some circumstances, outcomes are given slightly different weights according to their significance. For example, for political polling data answers from members of a first group may be counted 2% more than members of a second group because members in the first group are 2% more likely to vote than members of the second group. When trials are weighted, conventional processes determine $n_i$ by determining the $\Theta_i$ from the weighted mix of N trials, and multiplying $\Theta_i$ times N trials.

SUMMARY OF THE INVENTION

In one embodiment of the present invention a method for using a computer system to reduce overestimation of confidence intervals determined from weighted trial data includes adjusting a total number of trials N in downward trend using a factor derived from trial data weights. The method further includes determining a confidence interval using the adjusted total number of trials, interpreting the weighted trial data, and assigning the confidence interval to the interpreted data.

In another embodiment of the present invention a computer system for reducing overestimation of confidence intervals determined from weighted trial data includes a processor and a computer program storage medium coupled to the processor. The computer program storage medium includes code encoded therein, wherein the code is executable by the processor and includes code to:

adjust a total number of trials N in downward trend using a factor derived from trial data weights;

determine a confidence interval using the adjusted total number of trials;

interpret the weighted trial data; and assign the confidence interval to the interpreted data.

In another embodiment of the present invention a computer system for interpreting weighted trial data using a non-overestimated confidence interval includes means for adjusting a total number of trials N in downward trend using a factor derived from trial data weights. The computer system further includes means for determining the confidence interval using the adjusted total number of trials, means for interpreting the weighted trial data, and means for assigning the confidence interval to the interpreted data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The weighted confidence interval determination and application process described herein overcomes a discovered problem with conventional confidence interval determination processes. As described in more detail below, weighted trial data distorts conventional confidence intervals and implies higher than actual confidence intervals. However, the distortions have previously not been recognized. One reason the distortions have not been recognized is because the amount of trial data weighting has generally been small, e.g. <5%. Although increased weighting of trial data increases confidence interval inaccuracy, the small amount of conventional weighting typically generates only small confidence interval inaccuracies.

Technologies, such as product demand related technologies developed by Trilogy Development Group, Inc. of Austin, Tex., heavily weight trial data. Example product demand related technologies are described in U.S. patent Ser. No. 10/699,148 entitled "Identifying Quality User Sessions and Determining Product Demand with High Resolution Capabilities", inventor Daniel P. Karipides, filed on Oct. 31, 2003 (referred to herein as the "Karipides I Patent") and in U.S. patent Ser. No. 10/864,579 entitled "Product Demand Data Validation", filed on Dec. 9, 2004, inventors Dan Karipides, John W. Kamm IV, Elizabeth M. Schwartz, James H. Ogden (referred to herein as the "Karipides II Patent"). The Karipides I Patent and the Karipides II Patent are hereby incorporated by reference in their entireties. Product demand data generated using technology described in the Karipides I and II Patents often heavily weight trial data to obtain product demand indicators. Given the economic importance and potential commercial risks associated with reliance on product demand data, the question of data precision is often raised. To answer, for example, the question of data precision for data samples, the weighted confidence interval determination and application process described herein has been developed.

The weighted confidence interval determination and application process described herein, in one embodiment, adjusts the sample size N to account for the impact of weighting when determining confidence intervals. Conventional processes do not adjust the number of trials N when determining confidence intervals. Failure to adjust the trial size downward in correlation with weighting of trials has the effect of using an overly large trial size. As depicted in FIG. 1, increasing trial size N decreases the width of the confidence interval, thus, implying that conclusions drawn from the processed data are more precise than the data actually justifies. In one embodiment, if N is known, then for any outcome i, the number of trials $n_i$ resulting in outcome i, can be calculated as $$n_i = N \cdot \theta_i.$$

However, to calculate N, simply using the number of trials in the sample is incorrect. This is because $n_i$ no longer represents individual sessions, but rather the total number of sessions multiplied by some weighted average. If trials that have above average weight are counted as more than one "trial" in the $n_i$ total, and trials that have below average weight are counted as less than one "trial", then when calculating the low $l_i$ and high $h_i$ confidence interval bounds, errors are subject to underestimation on trials that have above average weight, and overestimation on trials that have below average weight. The weighted confidence interval determination and application process described herein can ensure that errors are not underestimated. If N is instead calculated as the sum of weights over all trials divided by the maximum weight: then any individual trial will never count as more than one "trial" in the $n_i$ total:

$$N = \frac{\sum_{k=1}^{n} w_k}{\max(w_1, w_2, \ldots w_n)}$$

where $$\frac{\sum_{k=1}^{n} w_k}{\max(w_1, w_2, \ldots w_n)}$$

represents one embodiment of a normalizing factor to determine a weight influenced N.

then any individual trial will never count as more than one "trial" in the $n_i$ total, where $w_k$ represents the weight of the $k^{th}$ trial, $k \in \{1, 2, \ldots, n\}$, "n" represents the total number of trials, and $\max(w_1, w_2, \ldots, w_n)$ represents the maximum of $w_1, w_2, \ldots, w_n$.

Each $n_i$ is calculated as:

$$n_i = N \cdot \theta_i = \frac{\sum_{k=1}^{n} \begin{cases} t_k = i : w_k \\ t_k \neq i : 0 \end{cases}}{\max(w_1, w_2, \ldots, w_n)},$$

where $t_k$ represents the trial data of the $k^{th}$ trial and "i" represents the $i^{th}$ outcome.

Expected probability $\Theta_i$ is calculated as:

$$\theta_i = \frac{\sum_{k=1}^{n} \begin{cases} t_k = i : w_k \\ t_k \neq i : 0 \end{cases}}{\sum_{k=1}^{n} w_k}.$$

Using the above determinations for N, $n_i$, and $\Theta_i$, confidence intervals can be accurately determined with a confidence probability of $p_{conf}$. "$p_{conf}$" is often specified as 95% but can be any desired confidence probability.

Figure 3:
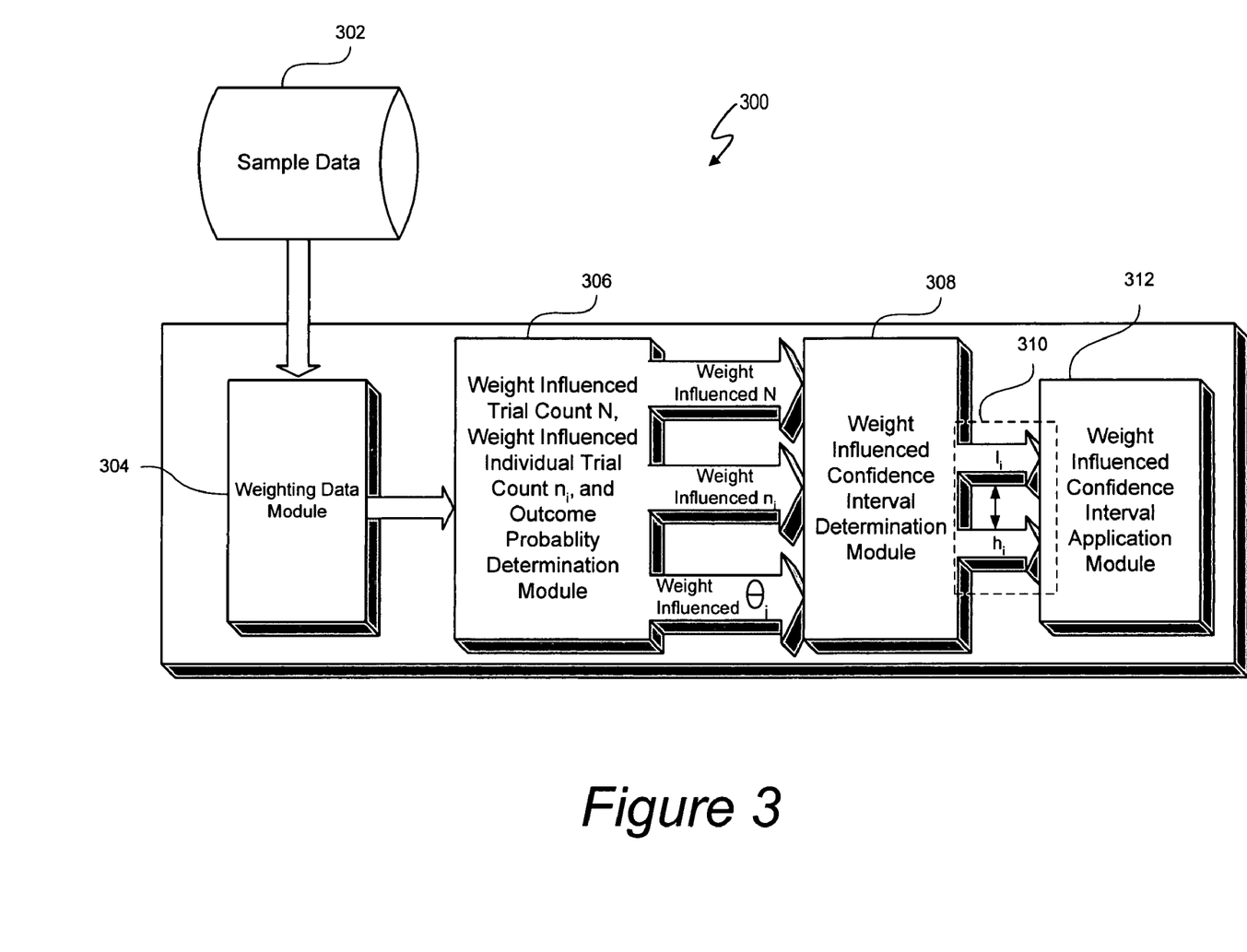
FIG. 3 depicts a weighted confidence interval determination and application system
Figure 4:
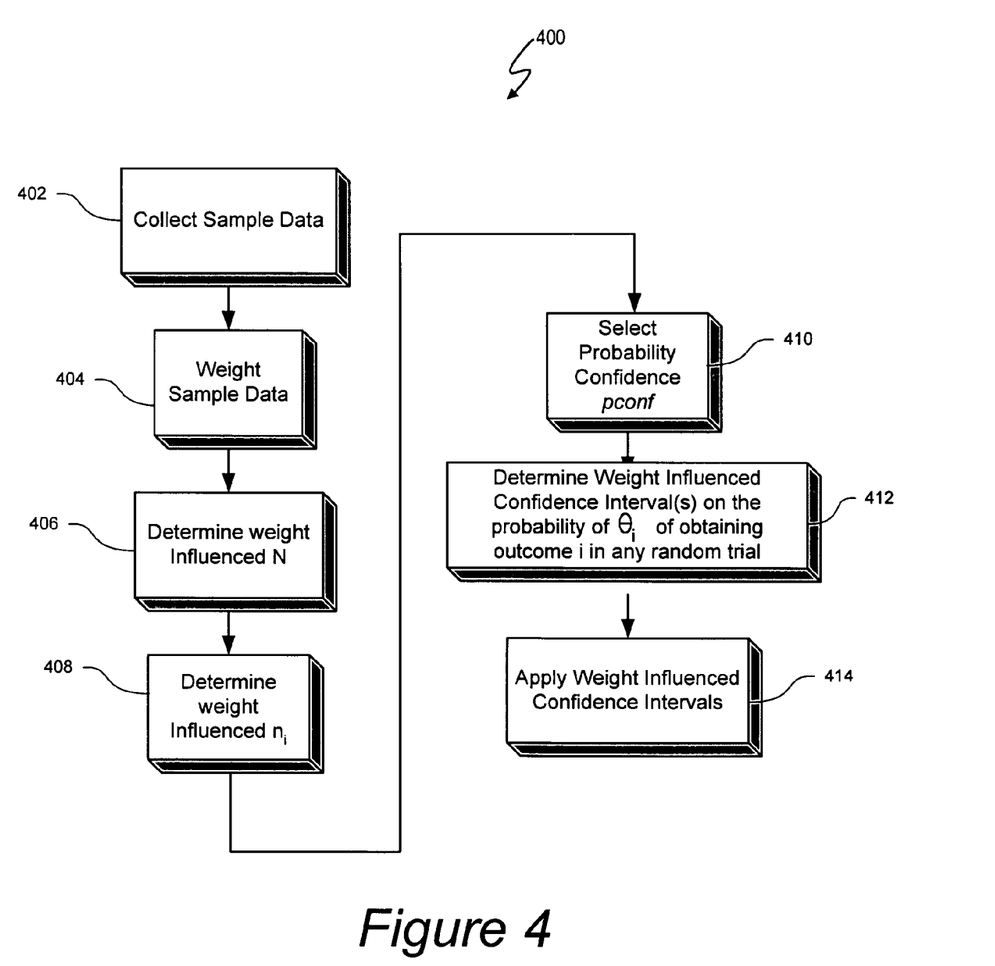
FIG. 4 depicts a weighted confidence interval determination and application process.

FIGS. 3 and 4 respectively depict a weighted confidence interval determination and application system 300 that performs confidence interval determination and application process 400. System 300 represents a data processing system configured to perform process 400. Together system 300 and process 400 process samples of weighted data trials, determine a confidence interval for the data, and apply the confidence intervals so that the data can be correctly interpreted. Operation 402 collects sample data 302. The sample data 302 can be any trial data.

System 300 and process 400 will be described below in conjunction with product demand data collected in accordance with the system and method described in Karipides et al. U.S. patent application Ser. No. 10/324,764, filed Dec. 20, 2002, entitled "Generating Contextual User Network Session History in a Dynamic Content Environment", which is hereby incorporated by reference in its entirety and weighted (scored) in accordance with the teachings of the Karipides I Patent. The weighted product demand data described in the Karipides I Patent is collected from Web user product configuration sessions and provides a good illustration of trial data having significantly varying weights and also having significant impact on major economic decisions. It will be understood by those of ordinary skill in the art that system 300 and process 400 can determine confidence intervals and apply the confidence intervals on any weighted data for any associated application.

The weighting data module 304 performs operation 404 to weight the trials in the sample data 302. In one embodiment, operation 404 weights the trials in accordance with the scoring process described in the Karipides I Patent. The trial data (e.g. product demand data) generated in accordance with the Karipides I Patent includes trials that are weighted (scored) with weights that can differ significantly. The system and process of the Karipides I Patent weights user product configuration session data using a score that indicates, in one embodiment, a propensity to purchase the product being configured. For example, in 10,000 automotive configuration sessions, assume that 3,500 users configure a low end trim, 2,000 users configure a medium trim, and 4,500 configure a high end trim. Also assume that all sessions are scored in accordance with the technology described in the Karipides I Patent. Even though the technology in the Karipides I Patent has been affirmed to indicate true product demand, this does not mean that 35% of all users want a low end trim, 20% of all users want a medium trim, and 45% of all users want a high end trim. First, randomness introduces the possibility that product demand measurements can be inaccurate, particularly if a sample size N is small. Furthermore, each session is session is weighted (scored), and the weighting may not be proportionately distributed across the users who picked the different trim levels. For example, a very high quality session can have a score that is 100's or 1,000's of times higher than the score of a low quality session. The 35% of users may have a disproportionate number of high or low quality sessions, and, thus, users who want a low end trim may represent more or less than 35% of the total scores.

Fortunately, the user behavior of selecting one of many options on a given feature variable, as illustratively described in the Karipides I Patent, can be well-characterized by a multinomial probability distribution. If it is known that 45% of all users want a high end trim, then a multinomial probability distribution exists. Measuring the behavior of 10,000 users is equivalent to N equal 10,000 trials of this distribution. Since this behavior is characterized by a multinomial distribution, the weight influenced confidence interval determination module 308 can perform operation 412 to determine weight influenced confidence intervals on the distribution, which provides a high bound, $h_i$, and a low bound, $l_i$, what the likely (i.e. probability confidence $p_{conf}$) of an outcome, i, is, given a number of N trials and the number $n_i$ of trials which resulted in outcome i.

In one embodiment, if N is known, then for any outcome i, the number of trials $n_i$ resulting in outcome i, can be calculated by module 306 performing operation 406 in accordance with:

$$n_i = N \cdot \theta_i \qquad \text{Equation 1}$$

However, to calculate N, simply using the number of trials in the sample is incorrect when the trials are weighted. This is because $n_i$ no longer represents individual sessions, but rather the total number of sessions multiplied by some weighted average. If trials that have above average weight are counted as more than one "trial" in the $n_i$ total, and trials that have below average weight are counted as less than one "trial", then when calculating the $l_i$ and $h_i$ confidence interval bounds, errors are subject to underestimation on trials that have above average weight, and overestimation on trials that have below average weight. The weighted confidence interval determination and application system 300 and process 400 can ensure that errors are not underestimated.

Module 306 performs process 406 to determine a weight influenced N. N is calculated as the sum of weights over all trials divided by the maximum weight: then any individual trial will never count as more than one "trial" in the $n_i$ total. In one embodiment, process 406 determines the weight influenced N in accordance with:

$$N = \frac{\sum_{k=1}^{n} w_k}{\max(w_1, w_2, \ldots, w_n)}. \qquad \text{Equation 2}$$

Thus, in this embodiment, any individual trial will not count as more than one "trial" in the $n_i$ total, where $w_k$ represents the weight of the $k^{th}$ trial and "n" represents the total number of trials.

Each $n_i$ is determined by module 306 performing operation 408. In one embodiment, operation 408 determines $n_i$ in accordance with:

$$n_i = N \cdot \theta_i = \frac{\sum_{k=1}^{n} \begin{cases} t_k = i : w_k \\ t_k \neq i : 0 \end{cases}}{\max(w_1, w_2, \ldots, w_n)}, \qquad \text{Equation 3}$$

where $t_k$ represents the trial data of the $k^{th}$ trial and "i" represents the $i^{th}$ outcome.

Module 306 also can determine the expected probability $\Theta_i$ of outcome i occurring in any random trial in accordance with:

$$\theta_i = \frac{\sum_{k=1}^{n} \begin{cases} t_k = i : w_k \\ t_k \neq i : 0 \end{cases}}{\sum_{k=1}^{n} w_k}. \qquad \text{Equation 4}$$

where $t_k = w_k$ when k=i, otherwise $t_k = 0$.

Assuming that on any trial, we have j possible outcomes. Then, in N trials, $n_1$ trials result in outcome 1, $n_2$ trials result in outcome 2, . . . , $n_j$ trials resulting in outcome j, such that $$n_1 + n_2 + \ldots n_j = N.$$

The probability $\Theta_i$ of obtaining outcome i in any random trial is expected to be $n_i/N$, though it is possible that if $\Theta_i$ were greater or lesser than this value, there would still be $n_i$ trials resulting in outcome i after N total trials. This is due to randomness, and can be explained by the multinomial distribution theorem.

The multinomial distribution theorem, which states that the probability of outcome 1 occurring $n_1$ times, and outcome 2 occurring $n_2$ times, . . . outcome $n_j$ occurring j times, is given by $$P(n_1, n_2, \ldots, n_j) = \frac{N!}{n_1! \cdots n_j!} \theta_1^{n_1} \cdots \theta_j^{n_j},$$

and, the probability of outcome i occurring $n_i$ times, regardless of the number of occurrences of the other outcomes, is $$P(n_i) = \frac{N!}{N_i!(N-n_i)!} \theta_i^{n_i} (1-\theta_i)^{(N-n_i)},$$

which can be obtained by summing the probabilities for all possible values of all the other $n_k$'s where $n_k \neq n_j$, while holding $n_i$ constant.

Moreover, if $X_i$ is defined as the probability distribution of $n_i$, given $\theta_i$, then the mean and variance of $X_i$ are:

$$\mu_i = N\theta_i$$

$$\sigma_i^2 = N\theta_i(1-\theta_i).$$

The weight influenced confidence interval determination module 308 performs operation 412 to determine a confidence interval defined by the lower and upper bounds ($l_i$ and $h_i$) of a confidence interval 310 on $\theta_i$ for every outcome i, based on a confidence probability $p_{conf}$, such as 95%, selected in operation 410. Confidence interval 310 is defined such that, for a given number of outcomes of i, $n_i$, in N trials, there is a $p_{conf}$ chance that the actual probability $\theta_i$ of outcome i, in the multinomial distribution lies between $l_i$ and $h_i$ inclusive. For simplicity's sake, module 308 assumes that the probability of being on the correct side of each bound is equal:

$$P(\theta_i \leq h_i) = P(l_i \leq \theta i) = \sqrt{p_{conf}}$$

$$P(\theta_i \leq h_i, l_i \leq \theta_i) = \sqrt{p_{conf}}^2 = p_{conf}.$$

This loses some generality. Process 412 could be configured to find a distribution more symmetric about the expected value and thus reduce $\max(l_i - n_i/N, h_i - n_i/N)$, i.e. the error, but the asymmetry tends to be minimal and this makes the determination of confidence interval 310 by process 412 more tractable, and, indeed, sometimes actually increases the confidence interval magnitude given by $h_i - l_i$.

The lower bound $l_i$ of confidence interval 310 is characterized such that if $\theta_i = l_i$, the probability of obtaining $n_i$ or fewer outcomes of i, in N trials is $1 - \sqrt{p_{conf}}$.

Fortunately, the Gaussian approximation to the multinomial distribution allows use of a normal curve with the same mean and variance as the probability distribution of the multinomial variate. The probabilities given by the Gaussian probability function will approach the probabilities for that variable as calculated by the multinomial theorem itself. Using the Gaussian probability function $P_G(z)$, the probability of randomly obtaining less than or equal to z in a Gaussian probability distribution with mean 0 and standard deviation 1 is $P_G(z)$.

Any Gaussian distribution can be normalized to mean 0 and standard deviation 1 by calculating a z-score using process 412. In the case of the distribution of $n_i$ given a lower bound outcome probability $l_i$, process 412 determines a z-score in accordance with:

$$z = \frac{n - \mu}{\sigma} = \frac{n_i - N l_i}{\sqrt{N l_i (1 - l_i)}}.$$

Since, $$P_G(z) = 1 - \sqrt{p_{conf}},$$

then:

$$P_G\left(\frac{n_i - N l_i}{\sqrt{N l_i (1 - l_i)}}\right) = 1 - \sqrt{p_{conf}}$$

$$\frac{n_i - N l_i}{\sqrt{N l_i (1 - l_i)}} = P_G^{-1}(1 - \sqrt{p_{conf}}),$$

given the well-defined inverse to the Gaussian probability function $P_G^{-1}$. Note: this function exists in Microsoft Corporation's Excel software product and is called NORMSINV.

Using the identity on $P_G^{-1}$ that $P_G^{-1}(1-a) = -P_G^{-1}(a)$:

$$\frac{n_i - N l_i}{\sqrt{N l_i (1 - l_i)}} = -P_G^{-1}(\sqrt{p_{conf}}).$$

Solving for $l_i$:

$$\frac{n_i - N l_i}{\sqrt{N l_i (1 - l_i)}} = -P_G^{-1}(\sqrt{p_{conf}})$$

$$\frac{(n_i - N l_i)^2}{N l_i (1 - l_i)} = \left[-P_G^{-1}(\sqrt{p_{conf}})\right]^2$$

$$\frac{(n_i - N l_i)^2}{N l_i (1 - l_i)} = \left[P_G^{-1}(\sqrt{p_{conf}})\right]^2$$

$$n_i^2 - 2 N n_i l_i + N^2 l_i^2 = [P_G^{-1}(\sqrt{p_{conf}})]^2 N l_i - [P_G^{-1}(\sqrt{p_{conf}})]^2 N l_i^2$$

$$[N(N + [P_G^{-1}(\sqrt{p_{conf}})]^2)] l_i^2 + [-N(2 n_i + [P_G^{-1}(\sqrt{p_{conf}})]^2)] l_i + [n_i^2] = 0,$$

and, by the quadratic equation:

$$l_i = \frac{-\left[-N\left(2 n_i + \left[P_G^{-1}(\sqrt{p_{conf}})\right]^2\right)\right]}{2\left[N\left(N + \left[P_G^{-1}(\sqrt{p_{conf}})\right]^2\right)\right]} \pm A.$$

$$A = \frac{\sqrt{\left[-N\left(2 n_i + \left[P_G^{-1}(\sqrt{p_{conf}})\right]^2\right)\right]^2 - 4\left[N\left(N + \left[P_G^{-1}(\sqrt{p_{conf}})\right]^2\right)\right][n_i^2]}}{2\left[N\left(N + \left[P_G^{-1}(\sqrt{p_{conf}})\right]^2\right)\right]}.$$

A false root is introduced into the equality when both sides were squared in the first two steps in solving for $l_i$ above. The false root is identified below. However, considering the upper bound $h_i$ of confidence interval 310, the upper bound $h_i$ is characterized such that if $\theta_i = h_i$, the probability of obtaining $n_i$ or greater outcomes of i, in N trials is:

$$1 - \sqrt{p_{conf}}.$$

Since the Gaussian probability function determines the probability of obtaining less than z-score, the contra positive, i.e. the probability of obtaining $n_i$ or fewer outcomes of i, in N trials, is:

$$\sqrt{P_{conf}}.$$

The z-scores are accordingly defined by:

$$z = \frac{n_i - Nh_i}{\sqrt{Nh_i(1-h_i)}},$$

for this distribution. In this distribution, $$P_G(z) = \sqrt{P_{conf}},$$

and, thus:

$$P_G\left(\frac{n_i - Nh_i}{\sqrt{Nh_i(1-h_i)}}\right) = \sqrt{P_{conf}}$$

$$\frac{n_i - Nh_i}{\sqrt{Nh_i(1-l_i)}} = P_G^{-1}\left(\sqrt{P_{conf}}\right),$$

The quadratic equation for $h_i$ contains identical coefficients to the one obtained solving for $l_i$, and thus the roots are the same:

$$h_i = \frac{-\left[-N\left(2n_i + \left[P_G^{-1}\left(\sqrt{P_{conf}}\right)\right]^2\right)\right]}{2\left[N\left(N + \left[P_G^{-1}\left(\sqrt{P_{conf}}\right)\right]^2\right)\right]} \pm A.$$

This indicates that the false root for $l_i$ is the true root for $h_i$ and vice versa. It's clear that $l_i \leq h_i$, so whichever of these two roots is lesser belongs to $l_i$ and whichever is greater belongs to $h_i$. Now, since the denominator $2[N(N+[P_G^{-1}(\sqrt{P_{conf}})]^2)] > 0$ is trivially positive, then the root which adds the radical is greater than the root which subtracts it. Thus, the lower and higher bounds of confidence interval 310 around $\Theta_i$ are:

$$l_i = \frac{-\left[-N\left(2n_i + \left[P_G^{-1}\left(\sqrt{P_{conf}}\right)\right]^2\right)\right]}{2\left[N\left(N + \left[P_G^{-1}\left(\sqrt{P_{conf}}\right)\right]^2\right)\right]} - A, \quad \text{Equation 5}$$

and $$h_i = \frac{-\left[-N\left(2n_i + \left[P_G^{-1}\left(\sqrt{P_{conf}}\right)\right]^2\right)\right]}{2\left[N\left(N + \left[P_G^{-1}\left(\sqrt{P_{conf}}\right)\right]^2\right)\right]} + A, \quad \text{Equation 6}$$

Again:

$$A = \frac{\sqrt{\left[-N\left(2n_i + \left[P_G^{-1}\left(\sqrt{P_{conf}}\right)\right]^2\right)\right]^2 - 4\left[N\left(N + \left[P_G^{-1}\left(\sqrt{P_{conf}}\right)\right]^2\right)\right]\left[n_i^2\right]}}{2\left[N\left(N + \left[P_G^{-1}\left(\sqrt{P_{conf}}\right)\right]^2\right)\right]}.$$

Thus, process 412 as performed by module 308 determines the weight influenced confidence interval 310.

The weight influenced confidence interval application module 312 performs process 414 to appropriately apply the confidence interval 310 to data. For example, applying process 414 to product demand data of the Karipides I Patent sets forth the confidence interval associated with the weighted product demand data, and, thus, allows the precision of the generated demand signals to be determined.

Figure 5:
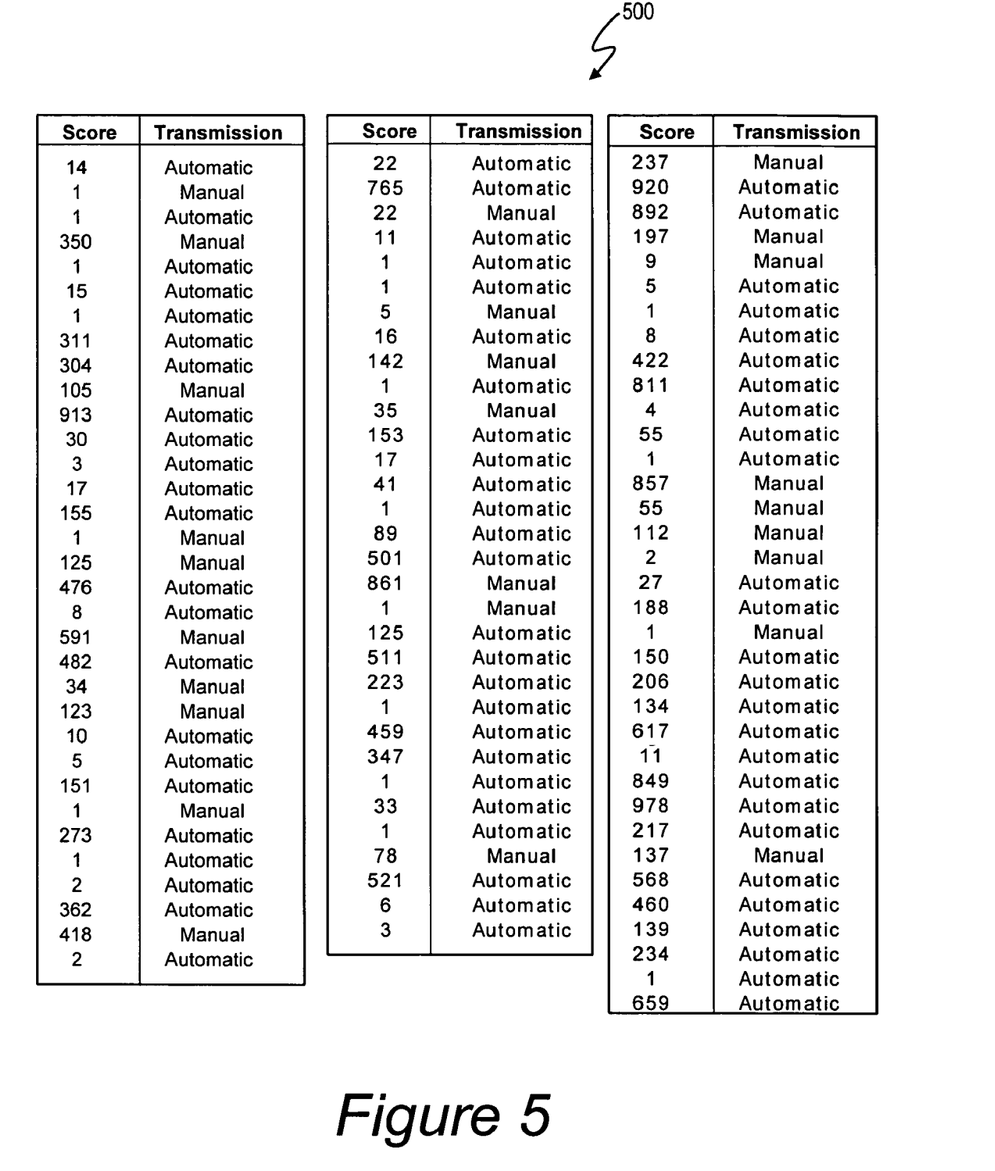
FIG. 5 depicts example product demand data.

For example, FIG. 5 depicts example product demand data 500 for automobiles with a manual transmission versus an automatic transmission. The product demand data 500 is broken into three tables for depiction purposes and each table includes a Score column and a Transmission column. The Score column contains the score from each trial (i.e. each user's session) as determined in accordance with the Karipides I Patent. The Transmission column depicts the user's selection of either Manual or Automatic. The total number of trials is 100. "i"=1 for an automatic transmission, and "i"=2 for a manual transmission. System 300 and process 400 determine the variables used to calculate confidence interval 310 as described above. Table 1 sets forth an example determination of confidence interval 310 using the data from FIG. 5. Specifically, expected probability $\Theta_i$, i={1, 2} is determined in accordance with Equation 4, N is determined in accordance with Equation 2, $n_i$ is determined in accordance with Equation 3, $l_i$ is determined in accordance with Equation 5, and $h_i$ is determined in accordance with Equation 6.

TABLE 1

| | |
|---|---|
| $\Theta_1$ | 0.779887 |
| $\Theta_2$ | 0.220113 |
| If using session count N derived using Equation 2: | |
| N | 20.90389 |
| n1 (automatic) | 16.30266 |
| n2 (manual) | 4.601227 |
| probability confidence, | 0.95 |
| $P_{conf}$ | |
| $l_1$ (n1 low error bound) | 0.568137 |
| $h_1$ (high error bound) | 0.905146 |
| absolute +/− error max ($h_1-\Theta_1$, $\Theta_1-l_1$) % | 21.175% |
| $l_2$ (low error bound) | 0.09486 |
| $h_2$ (high error bound) | 0.43186 |
| absolute +/− error max ($h_2-\Theta_2$, $\Theta_2-l_2$) % | 21.175% |

Thus, the weight influenced confidence interval determination module 308 and process 412 determines a confidence interval 310 that provide a confidence range $l_1$ to $h_1$ such that the unknown actual probability $\Theta_1$ of outcome 1 occurring in a random trial, given a sample of outcome 1 occurring, in weight influenced terms, 16.30266 times out of 20.90389 trials, has a 95% probability of falling within the range $0.568137 \leq \Theta_1 \leq 0.905146$), and the maximum absolute error equals max(0.905146−0.779887, 0.779887−0.568137)=0.21175=21.175%. The confidence interval 310 for i=2 is $0.09486 \leq \Theta_2 \leq 0.43186$, and the maximum absolute error also equals 21.175%. As illustrated in FIG. 1, increasing the sample size can decrease the width of the confidence interval and, thus, decrease the absolute error. "N" for product demand data generated from Web user configuration sessions can result in N>1,000,000.

Table 2 depicts the underestimation of the confidence interval when conventionally using the actual session count of N based on the data of FIG. 5.

TABLE 2

| | |
|---|---|
| $\Theta_1$: | 0.779887 |
| $\Theta_2$: | 0.220113 |
| If using session count as N: | |
| N | 100 |
| n1 (automatic) | 77.98865 |
| n2 (manual) | 22.01135 |
| desired confidence | 0.95 |
| $l_1$ (n1 low error bound) | 0.689448 |
| $h_1$ (high error bound) | 0.849728 |
| absolute +/− error max $(h_1-\Theta_1, \Theta_1-l_1)$ % | 9.0439% |
| $l_2$ (low error bound) | 0.15207 |
| $h_2$ (high error bound) | 0.31055 |
| absolute +/− error max $(h_2-\Theta_2, \Theta_2-l_2)$ % | 9.0439% |

Thus, using conventional methods of determining the confidence interval can result in a large overestimation of the confidence interval and decisions relying on the conventional methods unknowingly reflect a much larger amount of risk.

The weight influenced confidence interval application module 312 applies confidence interval 310 to actual data to allow data precision to be properly evaluated. For example, module 310 can apply the confidence interval 310 generated in accordance with system 300 and process 400 to indicate the precision of the product demand validation data generated in accordance with the Karipides II Patent. By knowing the precision of the product demand validation data, companies can better understand the level of risk associated with making economically impacted decisions based on the product demand validation data. Additionally, companies providing data analysis using weighted data can present the data with a level of statistical precision that increases the value of the data.

Figure 6:
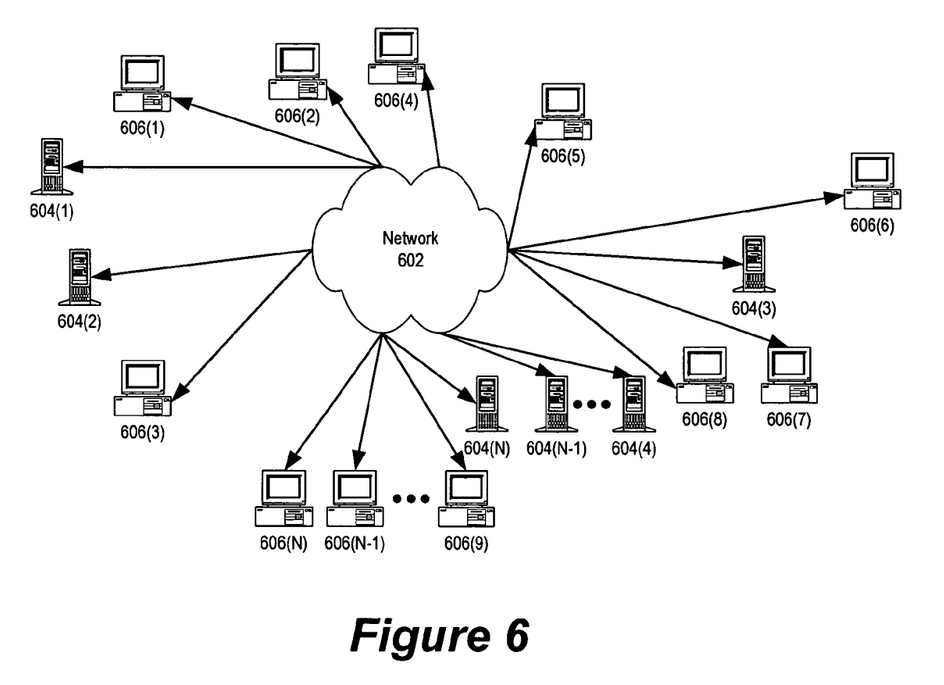
FIG. 6 depicts a block diagram illustrating a network environment in which the weighted confidence interval determination and application system of FIG. 3 can be practiced.

FIG. 6 is a block diagram illustrating a network environment in which a weighted confidence interval determination and application system 300 that performs confidence interval determination and application process 400 can be practiced. Network 602 (e.g. a private wide area network (WAN) or the Internet) includes a number of networked server computer systems 604(1)–(N) that are accessible by client computer systems 606(1)–(N), where N is the number of server computer systems connected to the network. Communication between client computer systems 606(1)–(N) and server computer systems 604(1)–(N) typically occurs over a network, such as a public switched telephone network over asynchronous digital subscriber line (ADSL) telephone lines or high-bandwidth trunks, for example communications channels providing T1 or OC3 service. Client computer systems 606(1)–(N) typically access server computer systems 604(1)–(N) through a service provider, such as an internet service provider ("ISP") by executing application specific software, commonly referred to as a browser, on one of client computer systems 606(1)–(N).

Client computer systems 606(1)–(N) and/or server computer systems 604(1)–(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 7.

Figure 7:
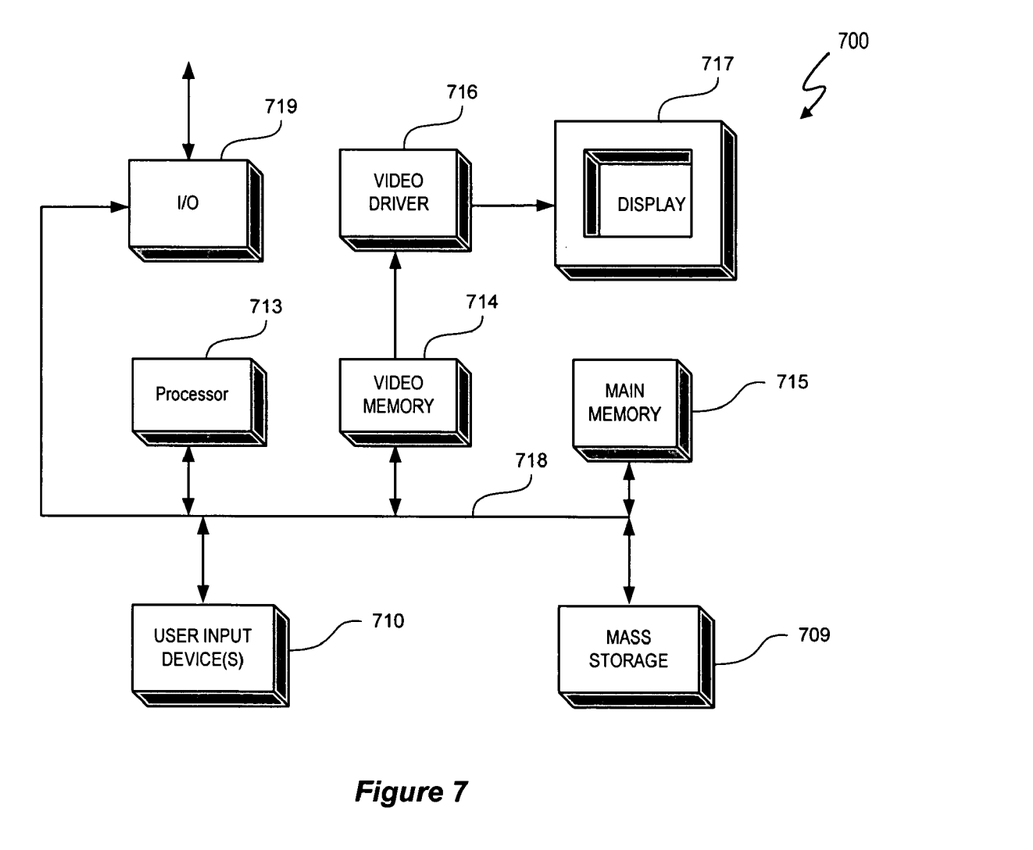
FIG. 7 depicts a general purpose computer system.

Embodiments of the system 300 and process 400 can be implemented on a computer system such as a general-purpose computer system 700 illustrated in FIG. 7. Input user device(s) 710, such as a keyboard and/or mouse, are coupled to a bi-directional system bus 718. The input user device(s) 710 are for introducing user input to the computer system and communicating that user input to processor 713. The computer system of FIG. 7 generally also includes a video memory 714, main memory 715 and mass storage 709, all coupled to bi-directional system bus 718 along with input user device(s) 710 and processor 713. The mass storage 709 may include both fixed and removable media, such as other available mass storage technology. Bus 718 may contain, for example, 32 address lines for addressing video memory 714 or main memory 715. The system bus 718 also includes, for example, an n-bit data bus for transferring DATA between and among the components, such as CPU 709, main memory 715, video memory 714 and mass storage 709, where "n" is, for example, 32 or 64. Alternatively, multiplex data/address lines may be used instead of separate data and address lines.

I/O device(s) 719 may provide connections to peripheral devices, such as a printer, and may also provide a direct connection to a remote server computer systems via a telephone link or to the Internet via an ISP. I/O device(s) 719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 709 until loaded into main memory 715 for execution. Computer programs may also be in the form of electronic signals modulated in accordance with the computer program and data communication technology when transferred via a network. The method and functions relating to system 300 and process 400 may be implemented in a computer program alone or in conjunction with any other type of processing related hardware.

The processor 713, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

The computer system described above is for purposes of example only. The system 300 and process 400 may be implemented in any type of computer system or programming or processing environment. It is contemplated that the system 300 and process 400 might be run on a stand-alone computer system, such as the one described above. The system 300 and process 400 might also be run from a server computer systems system that can be accessed by a plurality of client computer systems interconnected over an intranet network. Finally, the system 300 and process 400 may be run from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method for using a computer system to reduce overestimation of confidence intervals determined from weighted trial data, the method comprising:
    adjusting a total number of trials N in downward trend using a factor derived from trial data weights;
    determining a confidence interval using the adjusted total number of trials;
    interpreting the weighted trial data; and
    assigning the confidence interval to the interpreted data.

2. The method of claim 1 wherein the factor derived from trial data weights comprises a normalizing factor derived from weights of each trial set of data.

3. The method of claim 2 wherein the normalizing factor comprises:

$$\frac{\sum_{k=1}^{N} w_k}{\max(w_1, w_2, \ldots w_n)},$$

wherein $w_k$ represents the weight of the $k^{th}$ trial, $k \in \{1, 2, \ldots, N\}$ and $\max(w_1, w_2, \ldots, w_n)$ represents the maximum of $w_1, w_2, \ldots, w_n$.

4. The method of claim 1 wherein the confidence interval is bounded by respective upper and lower bounds.

5. The method of claim 4 wherein the upper and lower bounds of the confidence interval for an outcome i are derived from an expected probability $\Theta_i$ of outcome i occurring in any random trial, and expected probability $\Theta_i$ is derived from trial data weights from each of the N trials.

6. The method of claim 5 further comprising determining the probability $\Theta_i$ in accordance with:

$$\theta_i = \frac{\sum_{k=1}^{n} \begin{cases} t_k = i : w_k \\ t_k \neq i : 0 \end{cases}}{\sum_{k=1}^{n} w_k}$$

where $t_k = w_k$ when $k=i$, otherwise $t_k = 0$, and $w_k$ represents the weight of the $k^{th}$ trial, $k \in \{1, 2, \ldots, N\}$.

7. The method of claim 1 wherein the interpreted data comprises data representing demand data for one or more products.

8. The method of claim 7 further comprising:
    generating product demand data reports that include the interpreted data and assigned confidence interval.

9. The method of claim 7 wherein the one or more products are vehicles.

10. The method of claim 1 further comprising:
    displaying the interpreted data including the assigned confidence interval.

11. The method of claim 1 further comprising:
    collecting trial data from internet session data and applying weights to samples of the trial data to generated the weighted trial data.

12. The method of claim 1 wherein the trial data weights from which the factor is derived are non-zero.

13. A computer system for reducing overestimation of confidence intervals determined from weighted trial data, the computer system comprising:
    a processor; and
    a computer program storage medium coupled to the processor and having code encoded therein, wherein the code is executable by the processor and comprises code to:
        adjust a total number of trials N in downward trend using a factor derived from trial data weights;
        determine a confidence interval using the adjusted total number of trials;
        interpret the weighted trial data; and
        assign the confidence interval to the interpreted data.

14. The computer system of claim 13 wherein the factor derived from trial data weights comprises a normalizing factor derived from weights of each trial set of data.

15. The computer system of claim 14 wherein the normalizing factor comprises:

$$\frac{\sum_{k=1}^{N} w_k}{\max(w_1, w_2, \ldots w_n)},$$

wherein $w_k$ represents the weight of the $k^{th}$ trial, $k \in \{1, 2, \ldots, N\}$ and $\max(w_1, w_2, \ldots, w_n)$ represents the maximum of $w_1, w_2, \ldots, w_n$.

16. The computer system of claim 13 wherein the confidence interval is bounded by respective upper and lower bounds.

17. The computer system of claim 16 wherein the upper and lower bounds of the confidence interval for an outcome i are derived from an expected probability $\Theta_i$ of outcome i occurring in any random trial, and expected probability $\Theta_i$ is derived from trial data weights from each of the N trials.

18. The computer system of claim 17 further comprising code to determine the probability $\Theta_i$ in accordance with:

$$\theta_i = \frac{\sum_{k=1}^{n} \begin{cases} t_k = i : w_k \\ t_k \neq i : 0 \end{cases}}{\sum_{k=1}^{n} w_k}$$

where $t_k = w_k$ when $k=i$, otherwise $t_k = 0$, and $w_k$ represents the weight of the $k^{th}$ trial, $k \in \{1, 2, \ldots, N\}$.

19. The computer system of claim 13 wherein the interpreted data comprises data representing demand data for one or more products.

20. The computer system of claim 19 further comprising code to generate product demand data reports that include the interpreted data and assigned confidence interval.

21. The computer system of claim 19 wherein the one or more products are vehicles.

22. The computer system of claim 13 further comprising code to cause a display of the interpreted data including the assigned confidence interval.

23. The computer system of claim 13 further comprising code to perform an automated collection of internet session trial data and applying weights to samples of the trial data to generated the weighted trial data.

24. The computer system of claim 13 wherein the trial data weights from which the factor is derived are non-zero.

25. A computer system for interpreting weighted trial data using a non-overestimated confidence interval, the computer system comprising:
  means for adjusting a total number of trials N in downward trend using a factor derived from trial data weights;
  means for determining the confidence interval using the adjusted total number of trials;
  means for interpreting the weighted trial data; and
  means for assigning the confidence interval to the interpreted data.

26. The computer system of claim 25 wherein the factor derived from trial data weights comprises a normalizing factor derived from weights of each trial set of data and the normalizing factor comprises:

$$\frac{\sum_{k=1}^{N} w_k}{\max(w_1, w_2, \ldots w_n)},$$

wherein $w_k$ represents the weight of the $k^{th}$ trial, $k \in \{1, 2, \ldots, N\}$ and $\max(w_1, w_2, \ldots, w_n)$ represents the maximum of $w_1, w_2, \ldots, w_n$.

27. The computer system of claim 25 wherein the confidence interval is bounded by respective upper and lower bounds and the upper and lower bounds of the confidence interval for an outcome i are derived from an expected probability $\Theta_i$ of outcome i occurring in any random trial, and expected probability $\Theta_i$ is derived from trial data weights from each of the N trials.

28. The computer system of claim 25 wherein the trial data weights from which the factor is derived are non-zero.

* * * * *